March 4, 1969   J. H. MATTHEWS   3,430,808
LEVEL CONTROL SYSTEM FOR GRAVITY CONVEYOR
Filed March 17, 1967   Sheet 1 of 4

INVENTOR.
John Horton Matthews
BY
WILSON, SETTLE, BATCHELDER
ATT'YS. & CRAIG.

INVENTOR.
John Horton Matthews
BY
WILSON, SETTLE, BATCHELDER
ATTYS. & CRAIG

March 4, 1969  J. H. MATTHEWS  3,430,808
LEVEL CONTROL SYSTEM FOR GRAVITY CONVEYOR
Filed March 17, 1967

INVENTOR.
John Horton Matthews
BY
WILSON, SETTLE, BATCHELDER
ATT'YS. & CRAIG

United States Patent Office 3,430,808
Patented Mar. 4, 1969

3,430,808
LEVEL CONTROL SYSTEM FOR GRAVITY
CONVEYOR
John Horton Matthews, Royal Oak, Mich., assignor to
Multifastener Corporation, Detroit, Mich., a corporation of Michigan
Filed Mar. 17, 1967, Ser. No. 624,004
U.S. Cl. 221—10                             7 Claims
Int. Cl. G07f 11/58; B65g 11/20

ABSTRACT OF THE DISCLOSURE

An electrical system is provided which controls a feeding device supplying magnetic objects, such as pierce nuts, to a chute or other receptacle so that the feeding device is turned on when objects stacked in the chute drop below a minimum level and is turned off when the stack of objects rises to a maximum level. Inductor coils are wound about the chute at the minimum and maximum levels and act to sense the presence or absence of objects at those levels. A switching device controls the energization and de-energization of the feeding device and is in turn controlled by the sensor coils. When no magnetic objects are present in the coils, the coils cause the switching device to turn on the feeding device. When there are magnetic objects in both coils, the coils cause the switching device to turn off the feeding device. Thus, the level of objects in the chute is kept between the minimum and maximum levels.

Background of the invention

One application for the invention is in the feeding of pierce nuts to a punch press which installs the nuts in panels by a punching operation. Nuts are typically fed to the punch press through a chute to which nuts are supplied from a rotary hopper. Ordinarily, the nuts feed by gravity down through the chute to the punch press, and the feeding rate is great enough so that nuts stack up in the chute. The hopper runs continuously and keeps the chute full of nuts. However, continuous operation of the hopper causes problems. The nuts in the hopper are tumbled over and over as the hopper rotates, and this tumbling action can cause the nuts to wear excessively. Pierce nuts should have sharp edges since they punch their own hole in a panel when they are installed in the panel, but these edges can become dulled from wear due to the tumbling action of the rotary hopper. Also, portions of the nut thread may be peened over, or there may be some chipping of metal or other damage to the nuts because of excessive tumbling.

Summary of the invention

The present invention now proposes to alleviate these problems by providing a level control system which shuts off the feeding device when sufficient nuts are in the chute and turns it on only when nuts are actually needed in the chute. As previously mentioned, the nuts stack up in the chute. A minimum level for the top of the stack is selected, and the feeding device is turned on to supply additional nuts to the chute whenever the stack of nuts falls below the minimum level. Once the feeding device has been turned on, it remains on until the stack of nuts rises to a maximum level beyond which there is no need for further nuts. The feeding device is then turned off and remains off until the stack of nuts again falls below the minimum level.

In such a level control system, there is a need for a simple and yet reliable sensor to provide the minimum level and maximum level sensing functions. The present invention fulfills this need by using simple inductor coils as the minimum and maximum level sensors. The coils are wound around the chute and are placed at minimum and maximum levels on the chute. The impedance values of these coils vary depending on whether nuts are present or absent in the coils. The system is so designed that when no nuts are present in either of the sensing coils the hopper is turned on to feed nuts to the chute. When nuts fill both of the coils, the rotary hopper is turned off. The turn on condition occurs when the stack of nuts in the chute falls below the minimum level sensor, and the turn off condition occurs when the stack of nuts rises in the chute above the maximum level sensor. The hysteresis effect is achieved by appropriate design of the control circuitry which is operated by the minimum and maximum level sensors as will be described.

Accordingly, it is an object of the present invention to provide an improved level control system for controlling the feeding of magnetic objects through a nonmagnetic chute.

Another object of the invention is to provide a simple sensor for detecting the presence and absence of objects in a chute.

A further object of the invention is to provide simple control circuitry for controlling the feeding of objects to a chute in response to signals from maximum level and minimum level sensors.

Another object of the invention is to provide sensors for a level control system which will detect objects stacked up in a chute but which will not respond to objects falling through the chute.

Still another object of the invention is to provide sensors and control circuitry for controlling the level of nuts in a chute and which provide a substantial differential between the height of objects at which a feeding device is turned on and the height of objects at which the feeding device is turned off.

Other objects of this invention will appear in the following description and appended claims, reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Figure 1:
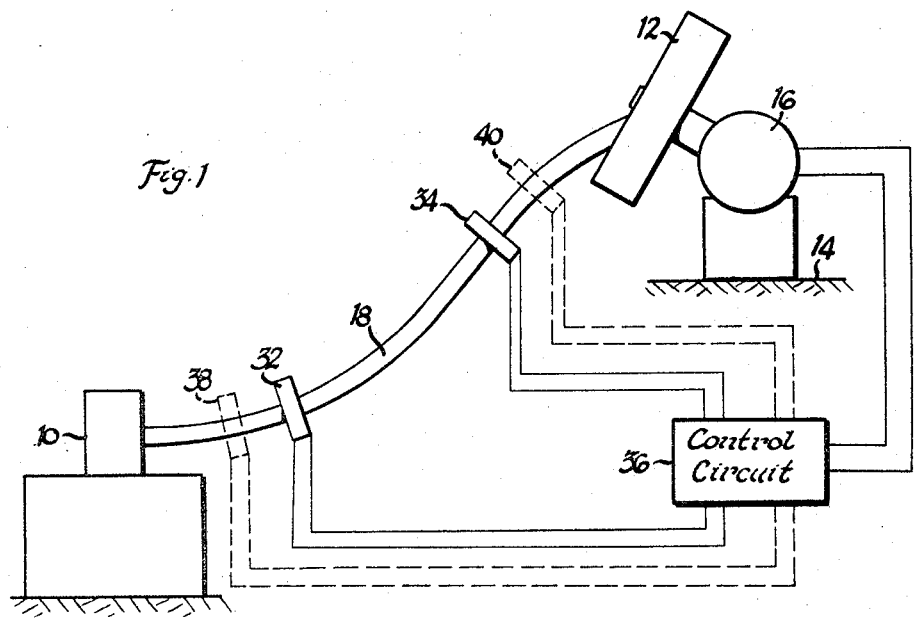
FIGURE 1 is a schematic view of nut feeding apparatus provided with a level control system in accordance with the invention.

As shown on the drawings:

FIGURE 1 schematically shows nut feeding apparatus provided with a level control system in accordance with the invention. Nuts are fed to a punch press 10 from a rotary hopper 12 which is mounted on a platform or floor 14 located near the punch press 10. The hopper 12 is driven by a motor 16, and as the hopper 12 rotates it feeds nuts into a chute 18 which extends in a generally vertical direction and leads from the hopper 12 to the punch press 10.

Figure 2:
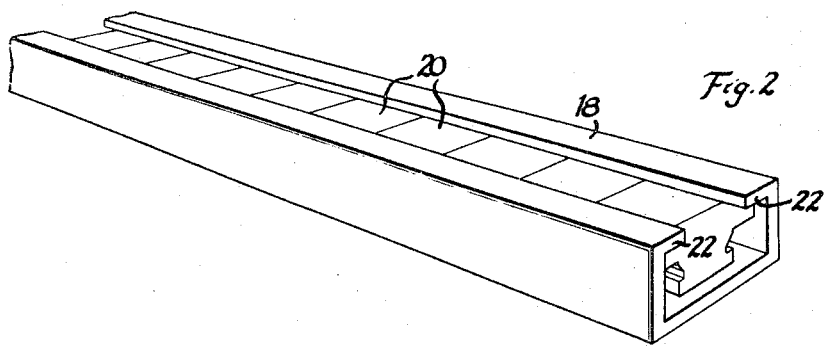
FIGURE 2 is a perspective view of a length of chuting filled with pierce nuts.

A portion of the chute 18 is shown in FIGURE 2, and it may be seen that this section of the chute 18 is filled with nuts 20. The nuts fit loosely in the chute and feed by gravity downwardly through the chute to the punch press. The chute 18 is preferably made of a strong plastic material which is somewhat flexible so as to allow the chute to be bent slightly. The chute has flanges 22 which are spaced apart as shown, and the nuts 20 are visible through the space between the flanges.

Figure 3:
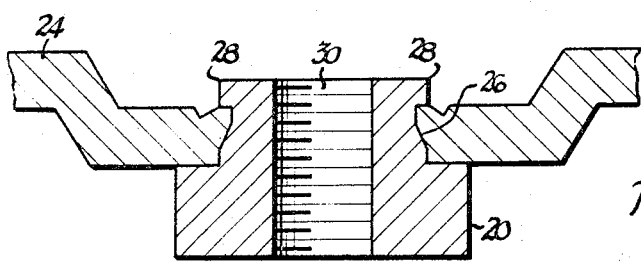
FIGURE 3 is a sectional view showing a pierce nut fastened in a panel.

FIGURE 3 shows one of the nuts 20 after it has been installed in a metal panel 24 by a punching operation in which the nut itself serves as a punch. Since the nut 20 punches out the opening 26 in which it fits, it is desirable for the edges and corners 28 of the nut to be sharp. If the hopper 12 were rotated continuously so as to keep the chute 18 full of nuts at all times, there would be a tendency for the edges and corners of the nuts to become dulled due to the tumbling action of the nuts in the hopper. Also, the threads 30 of the nuts may become peened over, and there is a risk of general wear and damage to the nuts.

In order to reduce the wear on the nuts, a level control system is provided which causes the rotary hopper 12 to operate only when nuts are needed in the chute 18. The level control system includes two sensors 32 and 34 and a control circuit 36 which is connected to the sensors and to the motor 16 of the rotary hopper 12. The sensors 32 and 34 are simple inductor coils which are wound about the chute 18 at two different places spaced along the length of the chute. Sensor coil 32 is placed at a low position on the chute below which the stack of nuts in the chute 18 are not to fall in normal operation of the apparatus. Sensor coil 34 is placed at a high position on the chute 18 beyond which the stack of nuts in the chute are not to rise in normal operation of the apparatus. The nuts 20 are made of a magnetic material, ordinarily steel, and nuts act as a core for the coils 32 and 34 when the nuts are present within the coils. Thus, the impedance values of the coils 32 and 34 vary depending on whether or not there are nuts present within the coils. The characteristics of the coils are such that a single nut falling down through chute 18 and passing through the coils 32 and 34 does not change the impedance of the coils sufficiently to actuate the control circuit 36. However, when nuts of a stack thereof are present within a given coil, its impedance value changes sufficiently to actuate the control circuit 36 in a manner to be described more fully hereinafter.

In the general operation of the level control system, the control circuit 36 is actuated to start the motor 16 of the rotary hopper 12 when the stack of nuts within the chute 18 falls below the lower coil 32. In this condition both coils 32 and 34 have no nuts within them. As nuts are fed from the hopper 12 into the chute 18, the stack of nuts rises into and past the lower coil 32 causing its impedance value to change and thus supply one unit of input voltage to the control circuit 36. The control circuit 36 is so designed that this single unit of input voltage does not cause it to turn off the hopper motor 16. The stack of nuts continues to rise in the chute 18 until it fills and passes the upper coil 34, and at this time both of the coils 32 and 34 are full of nuts and two units of input voltage are supplied to the control circuit 36. In this condition, the control circuit 36 is actuated to shut off the motor 16 of the hopper to thereby stop the supply of nuts to the chute.

As nuts are accepted from the chute by the punch press 10, the stack of nuts in the chute falls and a condition arises wherein there are no nuts within the upper coil 34 but the lower coil 32 does have nuts within it. In this condition, the control circuit 36 does not turn on the hopper motor 16. The hopper motor is not turned on until both coils 32 and 34 are empty, and of course this condition occurs when the stack of nuts falls below the lower coil 32. Thus, the hopper motor 16 is turned on when both coils 32 and 34 are empty and is turned off when both coils 32 and 34 are full.

In FIGURE 1, two additional coils 38 and 40 are shown by means of dashed lines. These additional coils may be provided as a safety feature, and the functioning of the system in response to these coils will be described hereinafter in connection with the embodiment of FIGURE 7.

Figure 4:
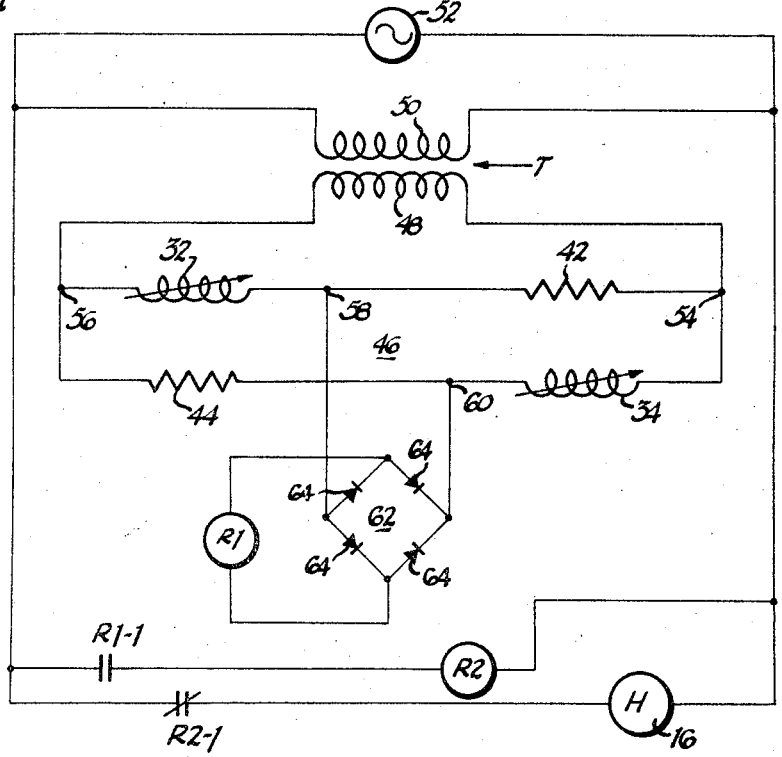
FIGURE 4 is a circuit diagram of one embodiment of a level control system in accordance with the invention.

Referring now to FIGURE 4, there is shown a circuit diagram for one embodiment of the invention. In this embodiment, the two sensor coils 32 and 34 are connected with two resistors 42 and 44 in a bridge circuit 46. The secondary winding 48 of a transformer T is connected across the input terminals 54 and 56 of the bridge circuit 46. The primary winding 50 of transformer T is connected to a source 52 from which an alternating voltage is supplied. The output terminals 58 and 60 of the bridge circuit 46 are connected to a full wave rectifier 62 comprised of four semi-conductor diodes 64. The output terminals of the rectifier are connected to a D.C. relay R1. Another relay R2 is connected in series with contacts R1–1 of relay R1 across the signal source 52. Also, connected across the signal source 52 is the hopper motor 16 in series with contacts R2–1 of relay R2.

The values of coils 32 and 34 and of resistors 42 and 44 may be selected such that the bridge circuit 46 is balanced when there is no magnetic material (no nuts) within the coils 32 and 34. For example the resistors 42 and 44 may each have a resistance value of 360 ohms, and the A.C. impedance value of coils 32 and 34 may also be 360 ohms when no nuts are present in the coils. When an alternating voltage is applied to the bridge circuit 46 from signal source 52 through the transformer T, the alternating voltage will appear across the output terminals 58 and 60 of the bridge in proportion to the degree of unbalance of the bridge. When there is no magnetic material within coils 32 and 34, the bridge is balanced and no voltage appears across relay R1. Relay R1 is therefore de-energized and its contacts R1–1 are opened so that relay R2 is also de-energized. In this condition, the motor 16 of the hopper will be energized through the normally closed contacts R2–1 of relay R2.

With the hopper energized to feed nuts into chute 18, coil 32 will soon be filled with nuts such that the bridge 46 will be unbalanced and will supply one unit of output voltage across the relay R1. The operating characteristics of relay R1 are selected such that it will not pick up in response to one unit of output voltage from the bridge 46. Accordingly, relay R2 remains de-energized and hopper motor 16 remains energized to keep nuts feeding into the chute 18. When coil 34 becomes filled with nuts, two units of output voltage will appear across output terminals 58 and 60. This will cause relay R1 to pick up, and its contacts R1–1 will close to pick up relay R2. Contacts R2–1 then open to de-energize the hopper motor 16 and stop the flow of nuts into the chute 18.

With the flow of nuts into the chute stopped, the punch press 10 continues to accept nuts from the chute such that the level of nuts in the chute will start to fall. When the stack of nuts has fallen below coil 34, one unit of output voltage is supplied from the bridge 46 to the relay R1. The characteristics of relay R1 are selected such that it will not drop out so long as one unit of output voltage is supplied to it. Thus, although relay R1 will not be picked up by one unit of voltage, once it has been picked up it will not drop out so long as one unit of voltage is applied to it. When the level of nuts falls below coil 32, the bridge circuit 46 is again balanced and at this time the relay R1 drops out. Relay R2 then also drops out, and contacts R2–1 close to again energize the hopper motor 16. This completes a cycle of operation.

Alternatively, the bridge circuit 46 may be designed such that it is balanced with magnetic material present in both coils 32 and 34. In this case, the relay R1 will energize when no magnetic material is present in either coil 32 or coil 34 and will de-energize when magnetic material is present in both coil 32 and coil 34. It is apparent that contacts R2–1 would have to be of the normally open type in order for the circuit to operate in these conditions. When no magnetic material is present within the coils, contacts R2–1 would be closed since R2 would be energized. With magnetic material present in both coils 32 and 34, the bridge is balanced, R1 and R2 are de-energized, and contacts R2–1 open to drop out the hopper motor 16. It may be noted that rectifier 62 could be omitted and a single A.C. relay connected to output terminals 58 and 60 could be substituted for the D.C. relay R1 and A.C. relay R2 in the embodiment of FIGURE 4 or relay R1 could operate hopper 16 directly.

Figure 5:
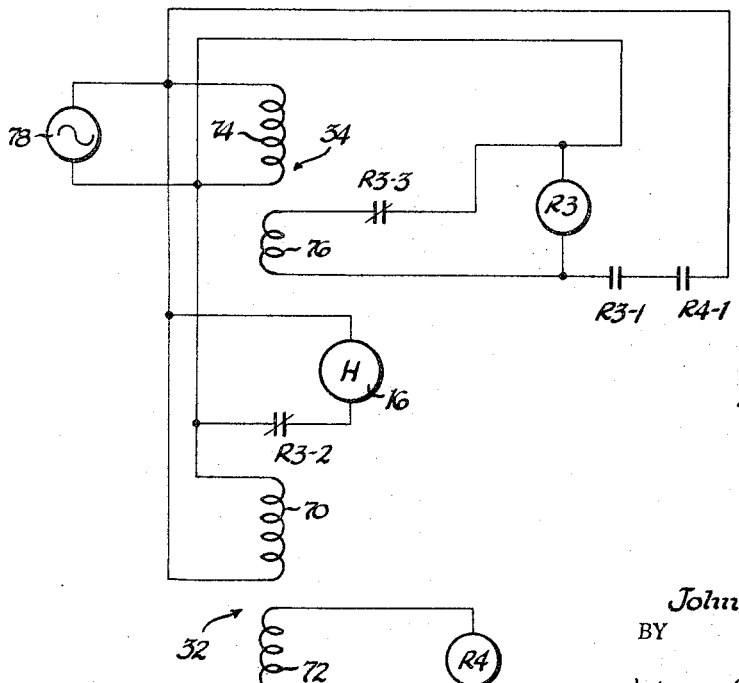
FIGURE 5 is a circuit diagram of another embodiment of the invention.

Referring now to the embodiment of FIGURE 5, it may be seen that the sensor coils 32 and 34 in this embodiment are actually transformers. Transformer 32 has a primary winding 70 and a secondary winding 72, and transformer 34 has a primary winding 74 and a secondary winding 76. Windings 74 and 76 are wound about chute 18 at the position of the high coil 34 and windings 70 and 72 are wound about the chute at the position of the low coil 32. A relay R3 is connected across secondary winding 76 and another relay R4 is connected across secondary winding 72. The primary windings 70 and 74 of the two transformers are connected in parallel to a signal source 78. The hopper motor 16 is connected in series with normally closed contacts R3–2 of relay R3, and the series circuit is connected across the signal source 78. Relay contacts R3–3 are connected between secondary winding 76 and relay R3. Relay contacts R3–1 and R4–1 are connected in series between relay R3 and the signal source 78.

When there is no magnetic material (no nuts) present in transformers 32 and 34, there is not sufficient coupling between the primary and secondary windings thereof to pick up the relays R3 and R4. In this condition, then, relays R3 and R4 are both de-energized. The hopper motor 16 is energized through the normally closed contacts R3–2 of relay R3. As nuts are fed by the rotary hopper into the chute 18, transformer 32 becomes filled with nuts, and sufficient signal from source 78 is coupled through the transformer to relay R4 to pick up that relay. This closes relay contact R4–1 but does not affect relay R3 nor the hopper motor 16. Nuts continue to stack up in the chute 18 until transformer 34 is filled with nuts, and at this time windings 74 and 76 are coupled and sufficient signal is coupled through these windings to pick up relay R3. Contacts R3–3 open disconnecting relay R3 from the secondary winding 76 but relay contacts R3–1 close at the same time, to connect relay R3 directly to the signal source 78 so that relay R3 remains picked up. Relay contacts R3–2 open so that the hopper motor 16 is dropped out, and this stops the supply of nuts to the chute 18. The level of nuts in the chute starts to fall and soon there is no magnetic material present in transformer 34. Relay R3 does not drop out, however, because it is connected directly to the signal source 78. When the level of nuts in the chute 18 falls below the lower coil 32, the transformer 32 is decoupled and relay R4 drops out. Relay contacts R4–1 open at this time and cause relay R3 to drop out. When this happens, contacts R3–2 close to again start the hopper motor 16. Contacts R3–1 open and contacts R3–3 close, but since windings 74 and 76 are decoupled, not enough signal is passed through the transformer 34 to pick up relay R3.

It is apparent from the foregoing description that the embodiment of FIGURE 5 accomplishes the same overall results as the embodiment of FIGURE 4 although different circuitry is used. The circuit of FIGURE 5 causes the hopper motor 16 to become energized when magnetic material is absent in both transformers 32 and 34, and causes the hopper motor 16 to become de-energized when magnetic material is present in both transformers 32 and 34.

Figure 6:
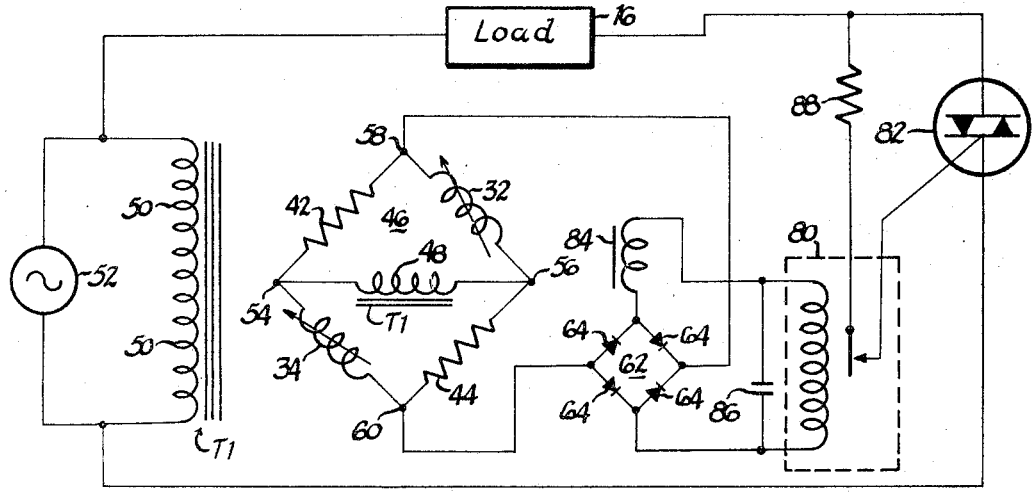
FIGURE 6 is a circuit diagram for an embodiment of the invention in which switching functions are provided by semiconductor devices.

The circuit of FIGURE 6 is very similar to that of FIGURE 4, and like reference numerals are used on like parts. A bridge 46 is formed by resistors 42 and 44 and coils 32 and 34, and input voltage is applied to the bridge from signal source 52 through a transformer having its primary winding 50 connected across source 52 and a secondary winding 48 connected across the input terminals 54 and 56 of the bridge. The coils 32 and 34 are wound about the chute 18 in the manner described in connection with FIGURE 1. The output terminals 58 and 60 of the bridge 46 are connected to a full wave rectifier 62 composed of diodes 64. The output from rectifier 62 is applied across the coil of a reed switch 80 which has its contacts connected to the gate of a triac device 82. Inductor 84 and condensor 86 are added to smooth the pulsating D.C. output of rectifier 62 for satisfactory operation of reed switch 80. Resistor 88 limits the gate current of triac device 82. The reed switch 80 thus controls the conduction of the triac device 82. The triac device 82 is similar to two semiconductor controlled rectifiers connected in an inverted parallel configuration, and it will conduct in both directions when it is turned on. A load 16, which may be the motor of a hopper, is connected in series with the triac device 82 across the transformer primary 50, and the triac device 82 controls the energization and de-energization of motor 16.

In the embodiment of FIGURE 6, the bridge 46 is designed such that it is balanced when magnetic material is present in both of the coils 32 and 34 and is unbalanced by two units of output voltage when there is no magnetic material present in either of the coils 32 and 34. When the bridge is balanced, no output voltage is applied to the coil of reed switch 80 and consequently the reed switch 80 is not energized and the triac 82 is nonconducting. Thus, the hopper motor 16 is turned off when nuts are present in both of the coils 32 and 34. As the level of nuts in the chute 18 falls, a point will be reached where there are no nuts present in coil 34, but coil 32 is full of nuts. In this condition, one unit of output voltage is applied to the coil of reed switch 80, but this is not sufficient voltage to energize reed switch 80. Thus, the triac unit remains nonconducting and the hopper motor 16 remains off.

When the level of nuts in the chute falls below coil 32, the bridge 46 is unbalanced by two units of output voltage, and this output voltage is applied to the reed switch 80 causing it to energize. An A.C. voltage is then applied through resistor 88 to the gate of the triac unit 82 causing it to become conducting. When the triac unit 82 conducts, the hopper motor 16 turns on and the hopper starts to deliver nuts to the chute 18. Coil 32 fills up with nuts shortly thereafter, but the drop in output voltage is not sufficient to turn off the reed switch 80 so the triac 82 remains conducting. When coil 34 also fills up with nuts, the bridge 46 is balanced and reed switch 80 and triac 82 both turn off. This completes a cycle of operation.

It may be noted that in the embodiment of FIGURE 6, the semiconductor device 82 is a switching device which serves the same purpose as the relay device R2 in FIGURE 1. In other words, the semiconductor device acts like a relay in fulfilling its switching function.

Figure 7:
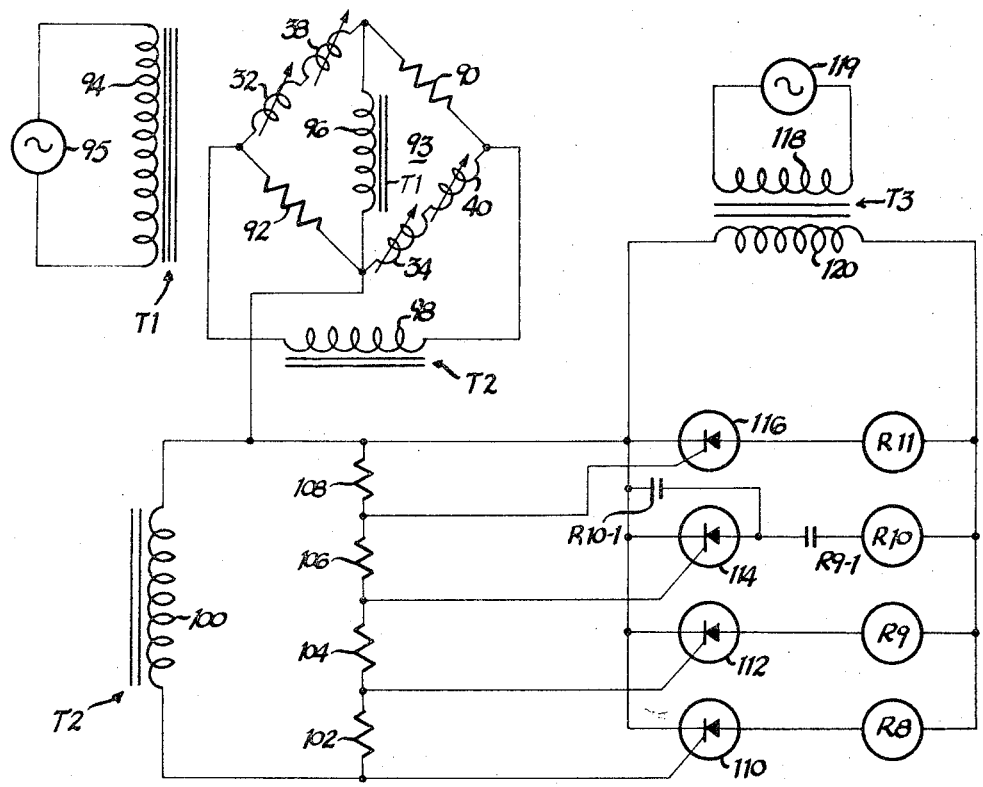
FIGURE 7 is a circuit diagram of an embodiment in which four sensors are provided.

FIGURE 7 shows an embodiment which employs four sensor coils 32, 34, 38 and 40. These coils are connected with resistors 90 and 92 to form a bridge circuit 93. Two of the coils 32 and 38 are located in one leg of the bridge, and the other two coils 34 and 40 are located in an opposite leg of the bridge. Alternating voltage from source 95 is applied to bridge 93 by a transformer T1 which includes windings 94 and 96. An output voltage appears across the output terminals of the bridge and is applied to a primary winding 98 of another transformer T2. The secondary winding 100 of transformer T2 is connected to a voltage divider comprised of four resistors 102, 104, 106 and 108 connected in series across winding 100. The circuit further includes four semiconductor controlled rectifiers 110, 112, 114 and 116, and these rectifiers are respectively connected to four relays R8, R9, R10 and R11. Each series combination of semiconductor controlled rectifier and relay is connected across the secondary winding 120 of a transformer T3, the primary winding 118 of transformer T3 being connected across a signal source 119. The junctions of the voltage divider formed by resistors 102, 104, 106 and 108 are connected respectively to the gates of the semiconductor controlled rectifiers 110, 112, 114 and 116 as shown in FIGURE 7. The voltage dividing resistors thus control the conduction of the semiconductor controlled rectifiers.

Since there are four separate coils in the bridge circuit 93, the bridge output may be zero, or one, or two or three, or four units. The bridge 93 is balanced and the zero output occurs when all four of the coils have no magnetic material in them. One unit of output voltage is present when coil 38 has nuts within it; two units of output voltage are present when both coils 38 and 32 have nuts in them; three units of output voltage appear when coils 32, 38 and 34 have nuts within them; and four units of output voltage appear when all four coils have nuts present within them. The bridge output voltage, modified as necessary by transformer T2, to match the input requirements of the SCR's appears across resistors 102, 104, 106 and 108 connected in series across the secondary winding 100 of transformer T2.

In operation, SCR 110 conducts when the bridge output is at least one unit, SCR 112 conducts at two units or more; SCR 114 conducts at three units or more, and SCR 116 conducts at four units.

While each SCR is conducting, its associated relay is energized. Latching contacts R9-1 and R10-1 have been provided on relays R9 and R10 respectively and are connected so that relay R10 will not drop out until relay R9 drops out. Relay R10 then energizes at a voltage between two and three units of output and de-energizes at a voltage between one and two units of output. Relay R11 will energize only when the material level exceeds the desired high limit by a predetermined amount and would be used to actuate an emergency shut off or warning device. Relay R8 similarly de-energizes when the material level falls below the desired low limit by a predetermined amount and would also be used to actuate a warning or emergency shut off device. Relay R10 has normally closed contacts in series with the motor 16 of the hopper (FIGURE 1), so the hopper motor stays energized until relay R10 picks up. Because of the latching contacts, relay R10 remains energized until relay R9 drops out. The hopper motor 16 is energized when coils 32 and 34 are both empty, and the motor is de-energized when coils 32 and 34 are both full of nuts. The relay R8 is de-energized only if the level of nuts should for some reason fall below coil 38, and relay R11 is only energized if the level of nuts should happen to rise enough to fill coil 40.

Figure 8:
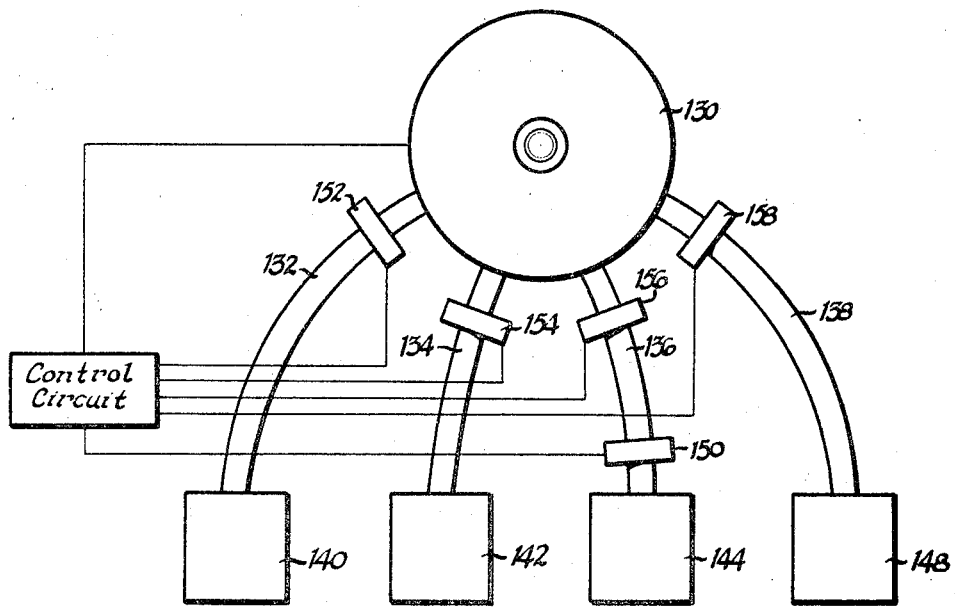
FIGURE 8 is a schematic drawing of a system in which four chutes are provided leading from a feeding device to four punch presses.

FIGURE 8 shows schematically another embodiment of the invention in which a hopper 130 feeds nuts to four chutes 132, 134, 136 and 138. The chutes lead to separate utilization devices designated respectively as 140, 142, 144 and 148. A single minimum level coil 150 has been provided on chute 136, and each of the chutes has one maximum level coil. The maximum level coils are designated 152, 154, 156 and 158.

Figure 9:
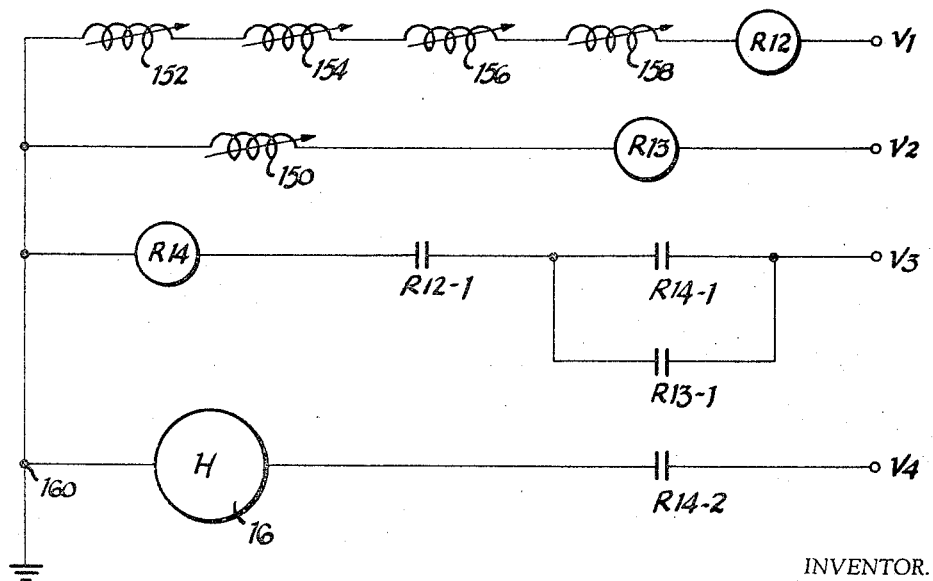
FIGURE 9 is a circuit diagram for a level control system suitable for use on the multiple chute embodiment of FIGURE 8.

FIGURE 9 shows the circuit diagram for the embodiment of FIGURE 8. It may be seen that there are four branch circuits connected between voltage supply terminals V1, V2, V3 and V4 and the ground terminal 160. One branch circuit contains the four relay coils 152, 154, 156 and 158 in series with a relay R12. The branch circuit connected to terminal V2 contains the other inductor coil 150 in series with a relay R13. Another relay R14 is connected by contacts R12-1, R14-1, and R13-1 to voltage terminal V3. The hopper motor 16 is connected by contacts R14-2 to the other voltage terminal V4. Operating potential is supplied to terminals V1, V2, V3 and V4 from a suitable source (not shown).

When all four of the maximum level coils 152, 154, 156 and 158 have nuts in them, relay R12 drops out. Relay R13 is also de-energized because its coil 150 has nuts in it. Relays R12 and R13 have contacts in series with relay R14 so relay R14 drops out when contacts R12-1 open. Contacts R14-2 open to shut off hopper motor 16. When the nuts fall below the four coils, relay R12 is energized but nothing happens to relay R14 as yet because relays R13 and R14 are still de-energized so contacts R13-1 and R14-1 remain open. Then when nuts fall below the lower limit coil 150, relay R13 is energized to complete the energizing circuit for relay R14 so R14 is energized. Contacts R14-2 close to complete the energizing circuit for the hopper motor 16 so the hopper is turned on. Nuts immediately fill the lower limit coil 150 to drop out relay R13 and open contacts R13-1. But relay R14 remains energized because the contacts R14-1 and R12-1 remain closed. When nuts fill up all four of the coils 152, 154, 156 and 158, relay R12 drops out to drop out relay R14. Contacts R14-2 open to de-energize the hopper motor 16 and this completes a cycle of operation.

It is evident from the foregoing description that the invention provides effective control of a feeding device for supplying nuts through a chute such that the feeding device operates only when nuts are needed by the utilization device to which the chute leads. The sensors which are used in the level control system are simple coil devices which are relatively fool-proof in operation. The control circuitry is straightforward and reliable so that the level control system can be expected to have a long operating life.

I claim:
1. A level control system comprising a generally vertically extending nonmagnetic receptacle, a feeding device operable when actuated to feed objects made of magnetic material to and through said receptacle, utilization means to accept such objects from said receptacle and allowing the objects to stack up in said receptacle when the objects are being fed to said receptacle by said feeding device, first coil means extending about said receptacle at a selected minimum height for the objects in said receptacle, second coil means extending about said receptacle at a selected maximum height for the objects in the receptacle, said first and said second coil means being electrically connected in a reactance bridge circuit, circuit means including a signal source, transform means coupling said signal source to said reactance bridge circuit, switching means connected to actuate and deactuate said feeding device, and means coupling said reactance bridge to said switching means for actuating said feeding device to supply objects of magnetic material to said receptacle when the level of objects in said receptacle falls below said minimum height and for deactuating said feeding device to stop the supplying of said objects to said receptacle when the level of objects in said receptacle rises above said maximum height, said objects acting as a core for said coil means when present therein whereby said first and said second coil means have different impedance values when said objects are present and not present therein.

2. The level control system of claim 1 in which said system further includes third coil means positioned about said receptacle at a predetermined height below said first coil means, fourth coil means positioned about said receptacle at a predetermined height above said second coil means, and in which said circuit includes means connecting said coil means in a bridge circuit with said first and third coil means in one leg of said bridge circuit and said second and fourth coil means in an opposite leg of said bridge circuit, said circuit means further including means for applying a signal to said bridge circuit, a plurality of switching means, one corresponding to each of said coil means, and means coupling said switching means to said bridge circuit so that said first coil means and a first of said switching means energizes said feeding device when the level of objects in said receptacle falls below said minimum height, said second coil means and a second of said switching means de-energizes said feeding device when the level of objects in said receptacle rises above said maximum height, and said third and fourth coil means together with third and fourth ones of said switching means respectively provide emergency shutdown of said feeding device in the event that objects in said receptacle fall a predetermined distance below said minimum height or rise a predetermined distance above said maximum height.

3. The level control system of claim 1 in which said first and second coil means respectively comprise first and second transformers each having a primary winding and a secondary winding, said objects acting as a core for said transformers when present in said windings thereof, and in which said circuit means comprises a signal source, means coupling the primary windings of said transformers to said signal source, a first relay connected to said secondary winding of said first transformer, a second relay connected to said secondary winding of said second transformer, said second relay having contacts connected to said feeding device for energizing and de-energizing the same, a latching circuit connecting said first relay to said signal source having contacts of each of said relays therein, and said second relay having contacts in circuit with said second transformer for cooperation with said latching circuit.

4. The level control system of claim 1 in which said switching means comprises relay means.

5. The level control system of claim 4 in which said relay means includes a first relay having contacts connected to said feeding device for energizing and de-energizing the same, said first relay being connected to said signal source, and a second relay having contacts in circuit with said first relay, said means coupling said reactance bridge to said switching means comprising rectifying means connected to said bridge and to said second relay for supplying unidirectional current to said second relay.

6. The level control system of claim 1 in which said switching means comprises semiconductor controlled rectifier means.

7. The level control system of claim 6 in which said semiconductor controlled rectifier means includes a two directional semiconductor controlled rectifier means connected to said feeding device for controlling energizing and de-energizing thereof, and a reed switch connected to said two directional semiconductor controlled rectifier means for operating the same, said means coupling said reactance bridge to said switching means comprising rectifying means connected to said bridge and to said reed switch.

References Cited

UNITED STATES PATENTS

| | | | |
|---|---|---|---|
| 2,114,297 | 4/1938 | Grover | 193—32 |
| 2,571,576 | 10/1951 | Hopkins et al. | 221—175 |
| 2,863,546 | 12/1958 | Josefowicz | 221—175 X |

WALTER SOBIN, *Primary Examiner.*

U.S. Cl. X.R.

193—32; 221—185